United States Patent [19]

Harigai et al.

[11] Patent Number: 5,311,311
[45] Date of Patent: May 10, 1994

[54] ENCODER FOR SUPERIMPOSING ENCODED CHARACTER DATA OR COMMAND DATA IN THE VERTICAL BLANKING INTERVAL FOR REGULATING VIDEO RECEIVER FUNCTIONS

[75] Inventors: Masami Harigai, Oizumi; Hiroyasu Shindou, Ashikaga, both of Japan

[73] Assignee: Sanyo Electric Co., Ltd., Moriguchi, Japan

[21] Appl. No.: 856,685

[22] Filed: Mar. 24, 1992

[30] Foreign Application Priority Data

Mar. 27, 1991 [JP] Japan .................. 3-063270

[51] Int. Cl.⁵ ................. H04N 7/08; H04N 7/087
[52] U.S. Cl. .................... 348/476; 348/473
[58] Field of Search ........... 358/142, 147, 335, 188; H04N 7/08, 7/087

[56] References Cited

U.S. PATENT DOCUMENTS

| | | | |
|---|---|---|---|
| 3,507,985 | 4/1970 | Breukink et al. | 358/147 |
| 3,982,064 | 9/1976 | Barnaby | 358/147 |
| 4,134,130 | 1/1979 | Tachi | 358/147 |
| 4,159,480 | 6/1979 | Tachi | 358/147 |
| 4,175,267 | 11/1979 | Tachi | 358/147 |
| 4,202,012 | 5/1980 | Hirashima | 358/147 |
| 4,205,343 | 5/1980 | Barrett | 358/147 |
| 4,423,440 | 12/1983 | Tachi | 358/147 |
| 4,451,848 | 5/1984 | Okada et al. | 358/147 |
| 5,063,456 | 11/1991 | Horiuchi et al. | 358/147 |
| 5,161,021 | 11/1992 | Tsai | 358/188 |
| 5,210,611 | 5/1993 | Yee et al. | 358/147 |

FOREIGN PATENT DOCUMENTS 0516058 12/1992 European Pat. Off. ..... H04N 7/087

Primary Examiner—Victor R. Kostak
Assistant Examiner—John W. Miller
Attorney, Agent, or Firm—Thomas R. Morrison

[57] ABSTRACT

An encoder disconnects video data between a video source and a video using device only during 21H in the vertical blanking interval. During 21H, it applies locally generated coded data signals, in a format detectable by conventional data decoding devices, to the video using device. The video source may be a camera or tape playback, and the using device may be a TV set or a video tape recorder.

8 Claims, 4 Drawing Sheets

ENCODER FOR SUPERIMPOSING ENCODED CHARACTER DATA OR COMMAND DATA IN THE VERTICAL BLANKING INTERVAL FOR REGULATING VIDEO RECEIVER FUNCTIONS

BACKGROUND OF THE INVENTION

The present invention relates to a video signal processing device and, more particularly, to a video signal processing device having a video signal processing circuit for encoding character data or command data within a vertical blanking period of a video signal for display.

In recent years, video signal processing device technology has greatly improved, allowing for the production of much cheaper and much smaller camcorder devices, greatly increasing their popularity as well as their accessibility. Consequently, camcorders are now widely available, allowing numerous users to record any desirable video event easily, such as a wedding ceremony, a child's birthday party, family travel and the like. As the number of video recordings increase, it becomes desireable to identify numerous video information recordings with date/time data. Present technology allows a user to program the date/time of the recorded video event into the video recorder.

This encoded date/time information is displayed at playback in a corner of a TV screen where it is immediately recognizable by the user.

TV receivers may have built-in decoders for decoding character information such as caption data. In such a device, a video signal containing encoded caption data transmitted from a camcorder or video cassette recorder (VCR) can display the encoded information during the video signal display.

A problem arises, however, when the viewer of a played back video signal wishes to remove, or delete, for example, date/time data from the TV screen that was previously recorded by the camcorder during video recording. This is because the date/time data are superimposed on the video signal itself during the video recording process. Once such data is recorded, it is impossible to delete the data in order to prevent its display on the TV screen when the video signal is played back. For example, the viewer may wish to more clearly view an area of the video screen where the date/time data is being displayed. However, without the means provided by the present invention, the date/time data cannot be conveniently deleted.

At present, video cassette recorders (VCRS) connected to TV receivers for the transfer of video signals do not provide means allowing the VCR user to encode caption or other data into the video signal for display. Further, even if caption data has been encoded into a video signal for display, it was not possible to regulate the operation of the TV receiver with it. For example, to regulate the sound volume of the TV receiver, a control code must be encoded into the video signal transmitted to the TV receiver. Also, the TV receiver must be provided with means for decoding such encoded sound volume regulating caption data.

OBJECTS AND SUMMARY OF THE INVENTION

Accordingly, it is an object of the present invention to provide a video signal processing device with a video signal processing circuit in which certain caption data may be encoded within a vertical blanking period of a video signal to be displayed. This encoding is possible by the present invention whether the video signal processing device is operating in recording or playback mode, thereby overcoming the drawbacks of the prior art.

It is another object of the present invention is to provide a video signal processing device, such as a camcorder, for recording a video signal for ultimate transmission to a TV receiver which includes a built-in encoder for encoding character or command data within a vertical blanking period of a video signal.

Yet another object of the present invention to provide a video signal processing device, such as a VCR, which may be connected to a TV receiver having decoding means for performing a decoding function on encoded caption data. The device is also provided with encoding means (corresponding to the decoding function) to enable the user to control the decoding functions of the TV receiver via the encoded caption data.

More specifically, in the case of a video signal processing device having the built-in encoder, such as a camcorder, the date/time data recorded by the camcorder may be encoded in a horizontal scanning period within the vertical blanking period of a video signal to be displayed. This encoded date/time data then becomes part of the video signal to be decoded on command. Therefore, when the video signal is played back by the TV receiver, the date/time data may be displayed or deleted on command.

Also, where the video signal processing device with the built-in encoder is a stationary VCR for transmitting a video signal to a TV receiver, command data for regulating sound volume (or other TV receiver function) can be encoded into a vertical blanking period of the video signal. More particularly, into a horizontal scanning period of the vertical blanking period of the video signal and thereby controlling the function of the TV receiver upon receipt of the encoded signal.

Briefly stated, the present invention provides an encoder that disconnects video data between a video source and a video using device only during 21H in the vertical blanking interval. During 21H, it applies locally generated coded data signals, in a format detectable by conventional data decoding devices, to the video using device. The video source may be a camera or tape playback, and the using device may be a TV set or a video tape recorder.

According to an embodiment of the invention, there is provided a video signal processing device, comprising: means for detecting a specific horizontal interval in a vertical blanking period of a television signal, means for encoding a data signal within the specific horizontal interval, the data signal being of a type detectable by a decoder, the data signal including a control portion and a caption data portion, and means for superimposing the data signal within the specific horizontal interval phase locked to the specific horizontal interval.

According to a feature of the invention, there is provided an encoder for superimposing encoded data on a specific horizontal interval in a vertical blanking period of a video signal, comprising: means for applying the video signal from a source to a using device, means for detecting the specific horizontal interval, means, operative only during the specific horizontal interval, for disconnecting the source from the using device, and for connecting an output of the encoder to the using device, means for producing a coding clock signal at a multiple of a horizontal scanning frequency of the video signal, phase locked to the video signal, means for gating a plurality of cycles of the coding clock signal to the using device during a run-in portion of the specific horizontal interval, means for storing a plurality of data bits, and applying means, effective following the run-in portion of the specific horizontal interval, for applying the plurality of data bits, stored in the means for storing, to the using device.

The above and other objects and advantages of the present invention will become apparent from the following description read in conjunction with the accompanying drawings, in which like reference numerals designate the same element.

DETAILED DESCRIPTION OF THE PREFERRED EMBODIMENTS

The present invention makes use of the closed caption system developed in this country. By using the video signal processing device of the present invention, dialogue, announcements, user information, and signals for controlling the TV (volume up/down for example) may be inserted into a video signal and transmitted either for presentation to the user in the form of an easily readable caption on a TV screen, or useable by the TV for controlling its functions. The U.S. closed caption system is similar to the Japanese system, a multiple character broadcasting system, compatible with the NTSC system.

The U.S. and Japan both use the NTSC system standard for broadcasting. Within the NTSC system, video information is displayed at a rate of 30 frames per second on a TV screen. Each frame is displayed using an interlaced scanning process (double interlaced scanning) whereby video information defining a complete frame is displayed as two interlaced fields, designated by odd and even numbers. Each field contains 262.5 horizontal scanning lines, which are displayed sequentially from top down. For a good explanation of the operation television and TV communication systems, (see Schure, BASIC TELEVISION, vols. 1-6 1974).

After a complete odd or even frame is displayed on the TV screen, the electron gun producing the video information must be blanked for retracing to begin the next frame. Blanking must occur during retracing to avoid overwriting the existing screen while the electron gun is moved to a new vertical location. A horizontal scanning period 1H is a period of time allotted (in accordance with NTSC) for the display of one horizontal line of video information on a TV screen. Each horizontal scanning period begins and ends with a horizontal sync pulse. No video data is written to the screen during vertical blanking. Conventional NTSC signals contain no video information during the vertical blanking period, but the horizontal sync signals are continued during vertical blanking in order to maintain horizontal sync during this period. Time allotted for vertical blanking equals at least 21 horizontal scanning periods in order to permit the vertical blanking of the electron beam.

In the video signal processing device of the present invention, caption data is encoded within a vertical retrace (blanking) period of a video signal for display. More specifically, caption data is encoded in a 21st horizontal scanning period 21H (normally not used for any other purpose) within the vertical blanking period of the video signal.

The present invention may be used to superimpose caption data on a camera output, such as, for example, a camcorder, either for display or recording. In addition, it may be used to superimpose caption data on recorded video data during reproduction, such as, for example, a video cassette recorder in playback mode.

Figure 1:
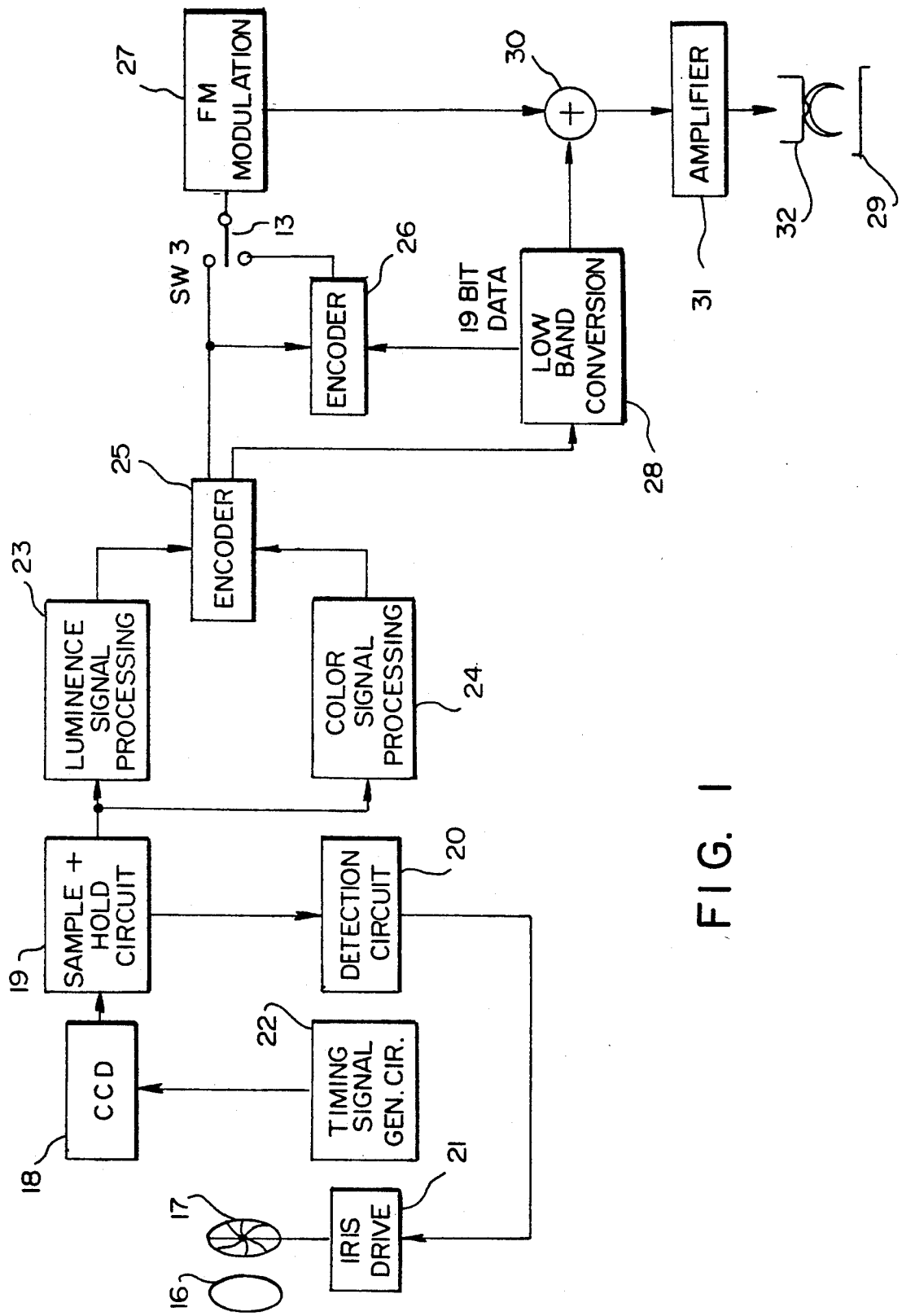
FIG. 1 depicts a block diagram of a camcorder having the built-in encoding function of the present invention.

Referring now to FIG. 1, a recording operation of a camcorder comprising the encoder of the present invention will be described.

Light defining video information is collected by a camcorder lens 16. The light is focused through an iris 17 for detection by Charge Coupled Device CCD 18. The photodetectors of CCD 18 photoelectrically convert the detected light to a quantity of voltage in accordance with the luminance of the light striking each one. The quantity of photoelectrically converted voltages is output in synchronization with a reading clock based on the number of pixel or image type photodetectors on the surface of CCD 18.

The output from CCD 18 is coupled to a sample-and-hold circuit 19. Sample-and-hold circuit 19 samples and holds the photoelectrically converted voltage signals output from CCD 18, which are then integrated by a detection circuit 20. The output from detection circuit 20 is applied to iris drive circuit 21 to control iris 17. Essentially, a light controlled feedback system is created wherein increases of detected light cause decreases in the amount of light allowed to pass through iris 17. In contrast, when the light defining the video information is lower, the integrated output of detecting circuit 20 decreases to a value smaller than standard values set inside iris drive circuit 21, thereby opening iris 17 to pass more light. Thus a feedback controlled loop is maintained whereby iris 17 is controlled automatically in accordance with the degree of luminance of the video information.

A timing signal generating circuit 22 generates a timing signal which controls the output of CCD 18.

A luminance signal processing circuit 23 is also coupled to the output of sample-and-hold circuit 19 for processing the luminance information contained in the video signal. A color signal processing circuit 24 processes and extracts an RGB signal from the color information contained in the video signal output from sample-and-hold circuit 19. The outputs of luminance signal processing circuit 23 and color signal processing circuit 24 are both applied to encoder 25.

The luminance signal output from encoder 25 is directly FM modulated by FM modulating circuit 27 when encoder 25 is connected to FM modulating circuit 27 through switch SW3 13. However, switch SW3 13 also provides a path from encoder 25 to FM modulating circuit 27 through an encoder 26 during the 21st horizontal period 21H of the vertical blanking period, whereby the run-in clock and 19-bit caption data are encoded and FM modulated.

In order to record the 3.58 MHz FM modulated color signal on a magnetic tape 29, a low-band converting circuit 28 must first be used to convert the 3.58 MHz FM modulated signal into a low band signal of about 700 KHz. To accomplish this, adder 30 adds the FM modulated luminance signal containing the caption data to a low-band converted color signal. The thus added video signal is then amplified by an amplifier 31 to a level suitable for application to recording head 32 from recording onto magnetic tape 29.

Figure 4:
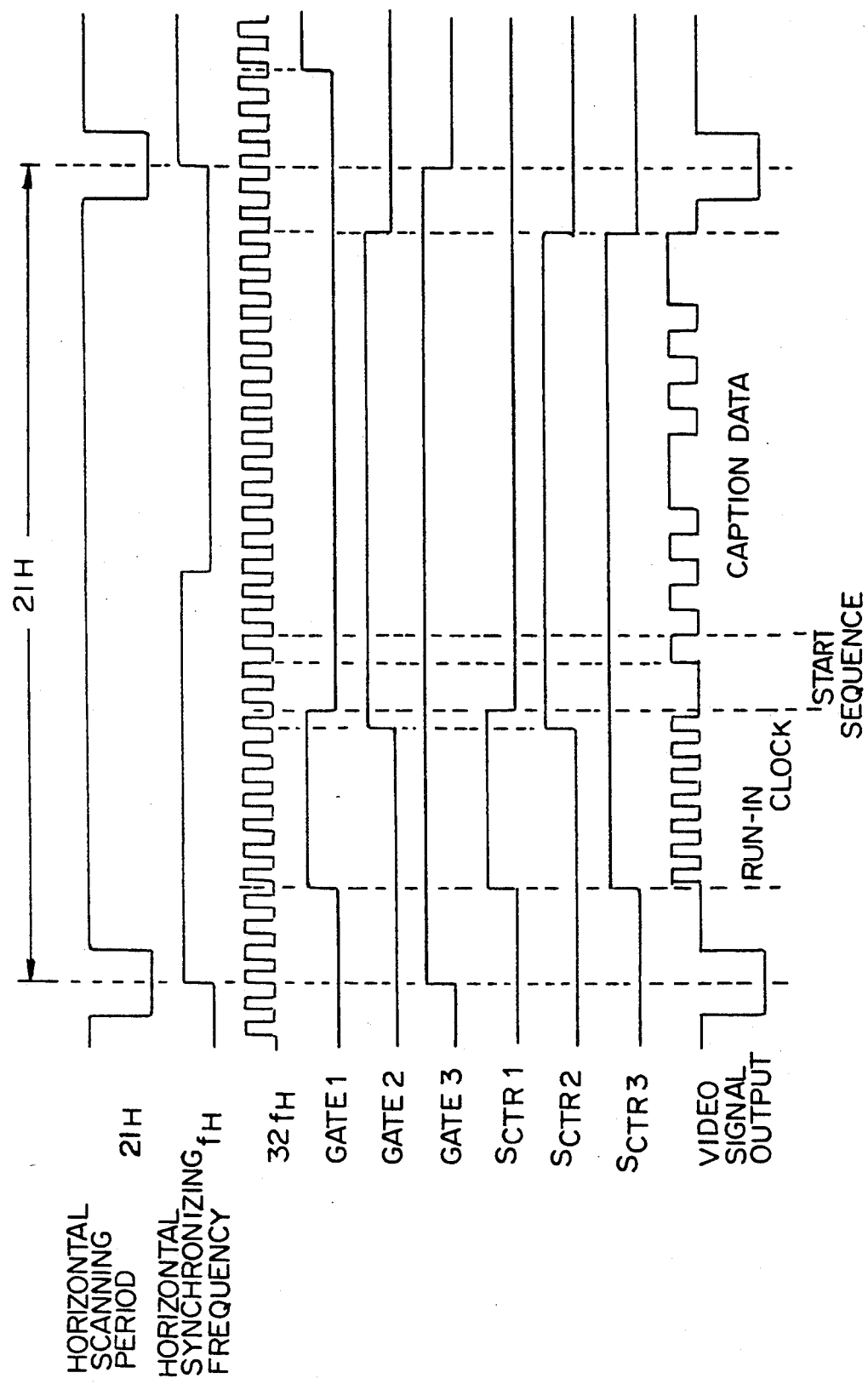
FIG. 4 is a timing chart defining an operational wave form in each part of the encoder depicted in FIG. 3.

Referring now to FIG. 4, once recorded on magnetic tape 29, caption data such as recorded date/time information, reside within 21H. 21H is the 21st horizontal scanning period of the vertical blanking period. The caption data is encoded within 21H (described in more detail below) in synchronization with a generated clock signal $32f_H$ ($f_H$=horizontal frequency of 15.73 KHz) in phase with signal $f_H$. The format of encoded 21H signal is as follows: beginning with the fifth cycle of $32f_H$, a run-in clock is generated consisting of 7 cycles of clock signal $32f_H$, a start sequence during the next 3 cycles of clock signal $32f_H$, followed by caption data during the next 16 cycles of clock signal $32f_H$. The caption data ends three cycles of clock signal $32f_H$ before the end of 21H. The final coded video signal output, shown in FIG. 4, is the signal output from encoder 26, in FIG. 1.

Once encoded, video signal output is incorporated back into the video signal for transmission. A TV receiver provided with a decoder for decoding such caption data allows a user to present or delete the decoded character information on the TV screen at the user's command. More specifically, if the user wishes to see particular video information being displayed within the screen area where the encoded information is displayed, he may easily delete it from the screen and thereby more clearly view the area he wishes to view.

Figure 2:
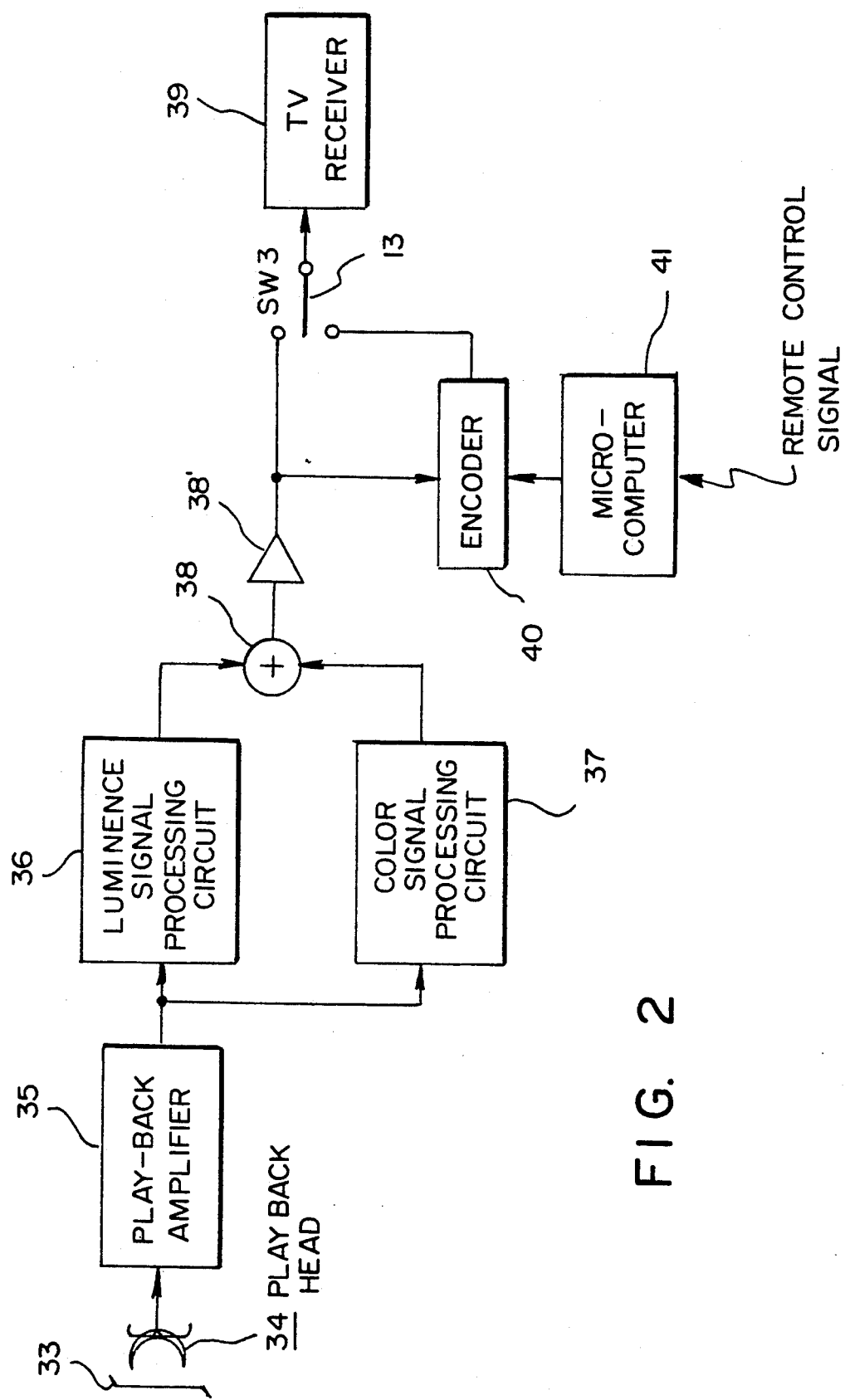
FIG. 2 depicts a block diagram of a stationary VCR with a built-in encoding function is a block diagram of another embodiment of the present invention.

Referring now to FIG. 2, the playback portion of a VCR embodying the encoder of the present invention will be described.

A playback head 34 performs helical scanning of magnetic tape 33. A video signal previously recorded on a video signal track is picked up and amplified to a level suitable for a signal processing by a playback amplifier 35. A luminance signal processing circuit 36 processes the luminance component contained in the video signal amplified by playback amplifier 35 and applies the result to a first input of an adder 38.

A color signal processing circuit 37 processes the color components of the video signal and applies the result to a second input to adder 38. An output of adder 38 is then applied through an amplifier 38' and switch SW3 13 to a TV receiver 39. If caption data has been encoded within 21H of the vertical blanking period of the video signal, it is decoded by a built-in decoder (not illustrated) within TV receiver 39, thereby enabling display.

A command such as, for example, a volume control command, may be encoded within the video signal by remote control before it is sent to TV receiver 39. An encoder 40 receives the outputs of amplifier 38' and remote control signals through a microcomputer 41. Microcomputer 41 acts as a receiver of control signals generated by the user and transmitted with a remote controller (not illustrated). Based on the transmitted control signal, microcomputer 41 causes the output signal from amplifier 38' to be routed through encoder 40 for encoding. Remote controller transmitted caption data (or command data), for example, caption data for regulating volume is transmitted in this manner.

When microcomputer 41 receives the caption data of the remote controller signal, the caption data is passed to encoder 40 for encoding into the 21st horizontal scanning period of the vertical blanking period of the video signal for display. The caption data encoded in 21H of the video signal is then passed to TV receiver 39 (having a built-in decoder) via switch SW3 13, which is closed only during the encoding in 21H. Switch SW3 13 is connected directly to the video source at all other times.

Accordingly, the sound volume of TV receiver 39, for example, may be controlled by the result of the signal received and decoded by the TV receiver. Before the encoding was available, sound volume could not be controlled in this way. As discussed above, a user may program on command a camcorder or VCR operating in either recording or play-back mode using the above encoding function, regardless of whether or not caption data is present in the source video signal.

Figure 3:
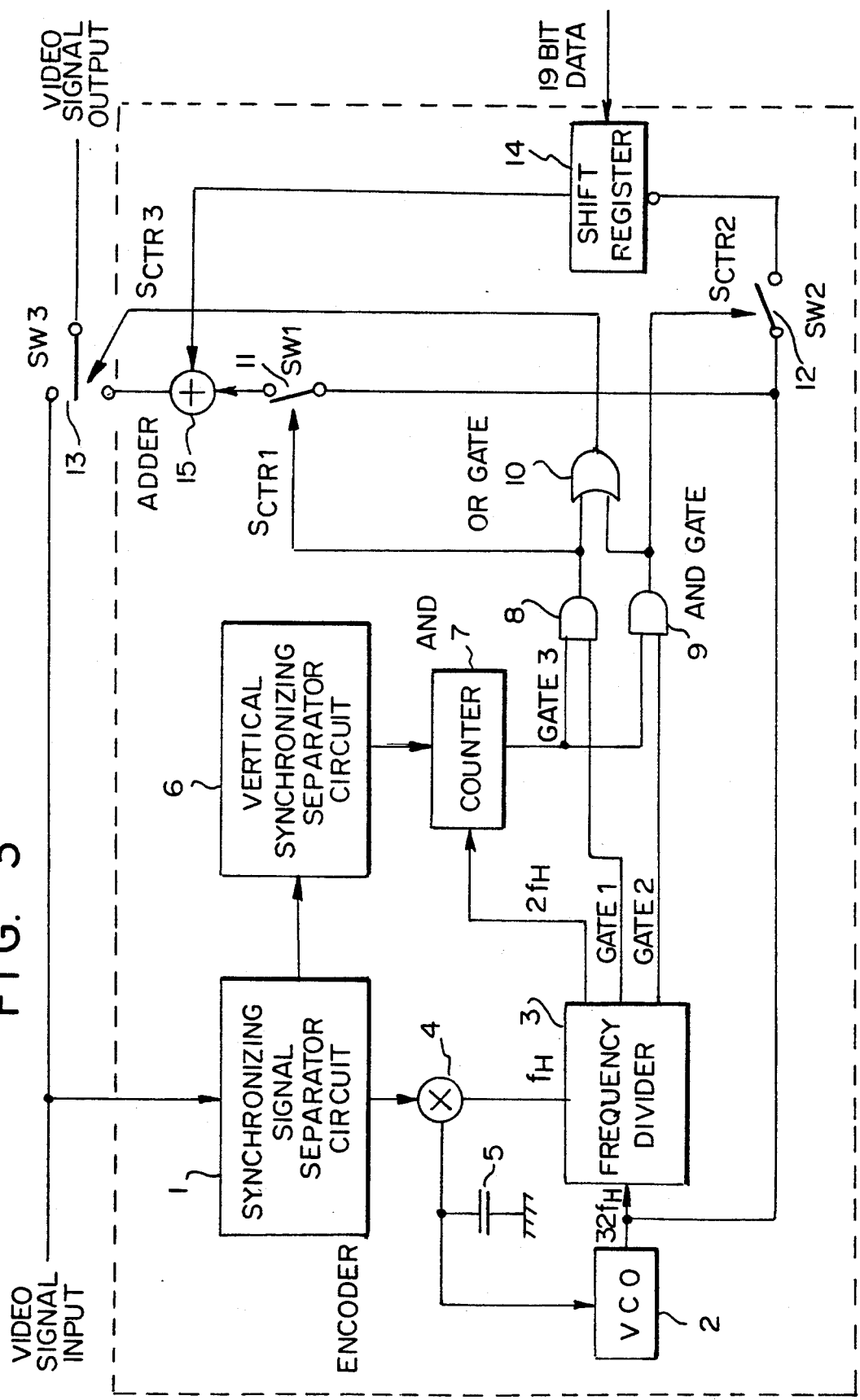
FIG. 3 is a block diagram of an encoder used in the embodiments of the present invention depicted in FIGS. 1 and 2.

Referring now to FIG. 3, encoder 26 is shown. Encoder 40 is identical to encoder 26, and will not be further detailed.

A video signal received by the encoder (video signal input) is applied to a signal separator circuit 1 that separates the horizontal and vertical signal components from it. The significant elements of these signals are the horizontal and vertical sync signals. The horizontal signal component from signal separator circuit 1 is applied to a phase-locked loop consisting of a multiplier 4, a capacitor 5, a voltage controlled oscillator (VCO) 2 and a 32×frequency divider 3. Output from signal separator circuit 1 is coupled both to a multiplier 4 and a vertical separator circuit 6.

Referring now also to FIG. 4, voltage controlled oscillator (VCO) 2 produces the $32f_H$ clock signal, phase locked to the horizontal sync pulses used in the encoding process. Frequency divider 3 divides the $32f_H$ by 32 to produce a signal at $f_H$. This signal is applied to one input of multiplier 4 which produces a product signal whose polarity and amplitude changes according the relationship between the phases of its inputs. If the phase of the counted-down signal is ahead of the phase of the horizontal sync signal from signal separator circuit 1, the polarity of the output of multiplier 4 is such as to reduce the frequency of VCO 2, thereby tending to align the phases of the two signals input to multiplier 4. If the phase of the counted-down signal lags that of the horizontal sync signal from signal separator circuit 1, the polarity of the output of multiplier 4 is such as to increase the frequency of VCO 2 thereby tending to align the phases of the two signals input to multiplier 4. Capacitor 5 acts as a boxcar circuit to hold the value of the product between inputs to multiplier 4.

In the manner described above, both the frequency and phase of the signal produced by VCO 2 are aligned with the horizontal sync pulses at frequency $f_H$, with the leading edge of the horizontal frequency signal $f_H$ and the edge of the clock signal $32f_H$ signal positioned at a center of the negative going pulse defining the period of the horizontal scanning period.

In addition to its function in the phase locked loop, frequency divider 3 divides down the $32f_H$ signal to provide a gate signal gate1 (gate1) applied to an input of an AND gate 8, a gate2 (gate2) signal applied to an input of an AND gate 9, a signal of frequency $2f_H$ applied to an input of a counter 7.

Vertical separator circuit 6 separates the vertical sync signals from vertical component received from signal separator circuit 1, and applies the result as a reset signal to counter 7. The edge of the vertical signal designating a vertical period triggers a charging function. When the charging function produces a signal exceeding a preset threshold level, a reset signal is output for resetting counter 7. In this embodiment, counter 7 is reset upon receipt of a first pulse of the vertical signal from the vertical separate circuit 6. Counter 7 counts the number of horizontal sync pulses received during the vertical blanking period and, during 21H, counter 7 produces a gates (gate3) signal that is applied to inputs of AND gates 8 and 9.

An NTSC system (as mentioned above) displays 30 frames per second on a TV screen. Each frame consists of two interlaced fields at 60 fields per second whereby video information defining a complete frame is displayed in two fields designated by odd and even numbers. Each field contains 262.5 horizontal scanning lines, which are displayed sequentially from top down.

Caption data is repeatedly encoded into the 21st horizontal frequency period within the vertical blanking period within odd and even fields. A time lag exists between the odd field 21H and the even field 21H with a lag equal to H/2, or half a horizontal scanning period. Therefore, in order for the vertical signal derived by vertical separator circuit 6 to accurately detect 21H of both fields whether derived from even or odd numbered fields, counter 7 carries out the count-up procedure in synchronization with $2f_H$ rather than the $f_H$ clock.

Thus, counter 7 receives a signal indicating whether an odd or even field is being displayed. When counter 7 has detected the 21st horizontal scanning period 21H within either field, it outputs a gate signal gate3 (gate3), designating the 21st period, 21H.

Frequency divider 3 sets gate1 output high within a period beginning with a fifth cycle of clock $32f_H$ to the eleventh cycle, counted down in sync with a rising edge of $f_H$. This clock sequence, called the run-in clock, is thereby encoded within 21H. Gate2 goes high within a period beginning with the twelfth and running through the thirtieth cycle of $32f_H$ in order to overlap a start sequence composed of 3 bits and caption data of 16 bits in 21H.

An AND gate 8 is enabled only when signals gate1 and gate3 are high, which also sets switch control signal SCTRL high. AND gate 9 sets a switch control signal SCTR2 high only when signals gate2 and gates are high.

An OR gate 10 is enabled when either switch control signals SCTR1 and SCTR2 are high, setting switch control signal SCTR3 high. When SCTR1, SCTR2 and SCTR3 go high, switches SW1 11 and SW2 12 are closed and a switch SW3 13 connects an adder 15 to the video signal output, discussed below.

Encoding is essentially as follows. Switch 13 is switched from transmitting the video signal straight through to the output to a position receiving the output of adder 15 only during the presence of signal SCTR3. This signal only occurs during the run-in, start sequence and caption data portions of 21H. Switch 11 is closed during the run-in portion of 21H to apply seven cycles of the $32f_H$ to one input of adder 15, and is open at all other times. The 19-bit start sequence and caption data, previously stored in shift register 14 is counted out of shift register 14 to adder 15 by the leading edges of 19 cycles of the $32f_H$ signal fed through switch 12, which is closed by signal SCTR2 only during the start sequence and caption data portion of 21H.

The caption data consists of 16 bits, serially connecting command data or display data of 8 bits containing a single parity bit, now part of the video signal.

Having described preferred embodiments of the invention with reference to the accompanying drawings, it is to be understood that the invention is not limited to the precise embodiments and that various changes and modifications may be affected therein by one skilled in the art without departing from the scope or spirit of the invention which is limited only by the appended claims.

What is claimed is:

1. A video signal processing device, comprising:
   means for detecting a specific horizontal interval in a vertical blanking period of a television signal;
   means for encoding a data signal within said specific horizontal interval, said data signal being of a type detectable by a means for decoding;
   said data signal including a control data portion, being effective to control a function of a video receiver;
   means for superimposing said data signal within said specific horizontal interval phase locked to said specific horizontal interval; and
   said means for detecting, means for encoding, and means for superimposing being operative during a record mode and a play mode of said device.

2. Apparatus according to claim 1, wherein:
   said means for encoding includes means for generating a coding frequency that is an integral multiple of a horizontal scanning frequency of said television signal;
   said data signal including a first portion and a second portion;
   said first portion including a run-in clock containing a plurality of cycles of said coding frequency;
   said second portion including said caption data; and
   said run-in clock preceding said caption data portion.

3. Apparatus according to claim 1, wherein said means for superimposing includes means for superimposing said data signal on both odd and even fields of said television signal.

4. Apparatus according to claim 3, wherein said means for superimposing includes means for producing a $2f_H$ signal having a frequency of twice said horizontal scanning frequency, and means for employing alternate cycles of said $2f_H$ signal to control said superimposing on alternate fields, whereby a lag of H/2 is imposed on even fields, whereby encoding can be performed on both odd and even fields.

5. A device for controlling a video receiver comprising:
   means for detecting a predetermined horizontal interval in a vertical blanking period of a video signal;
   means for encoding a signal within said predetermined horizontal interval;
   said signal including a control data portion, being effective to control a function of said video receiver;
   means for superimposing said signal to said predetermined horizontal interval;
   said means for superimposing including means for phase-locking said signal to said predetermined horizontal interval;
   said video receiver including means for decoding said signal; and said means for detecting, means for encoding, and means for superimposing being operative during a record mode and a play mode of said device.

6. A device according to claim 5, wherein said signal including a caption data portion.

7. A device according to claim 6, further comprising a microcomputer sending a control signal to said means for superimposing.

8. A device according to claim 5, wherein said function including a regulation of sound volume.

* * * * *